(No Model.)

D. H. FAUST.
VEHICLE WRENCH.

No. 496,355.  Patented Apr. 25, 1893.

Witnesses,

Inventor,
Daniel H. Faust.
By Dewey & Co.
Attys

UNITED STATES PATENT OFFICE.

DANIEL H. FAUST, OF STOCKTON, CALIFORNIA.

VEHICLE-WRENCH.

SPECIFICATION forming part of Letters Patent No. 496,355, dated April 25, 1893.

Application filed September 9, 1892. Serial No. 445,454. (No model.)

*To all whom it may concern:*

Be it known that I, DANIEL H. FAUST, a citizen of the United States, residing at Stockton, San Joaquin county, State of California, have invented an Improvement in Vehicle-Wrenches; and I hereby declare the following to be a full, clear, and exact description of the same.

My invention relates to a device which I call a vehicle wrench.

It consists in certain details of construction which will be more fully explained by reference to the accompanying drawings, in which—

Figure 1:
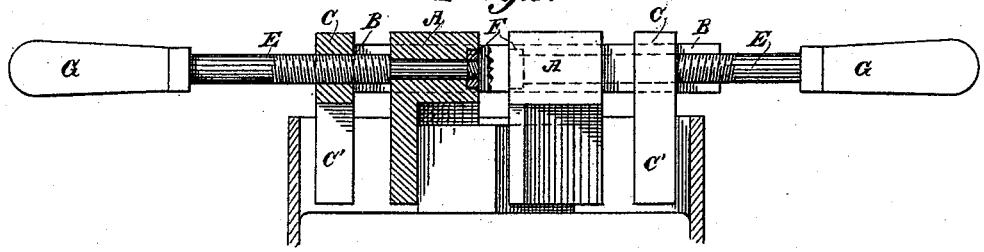
Figure 2:
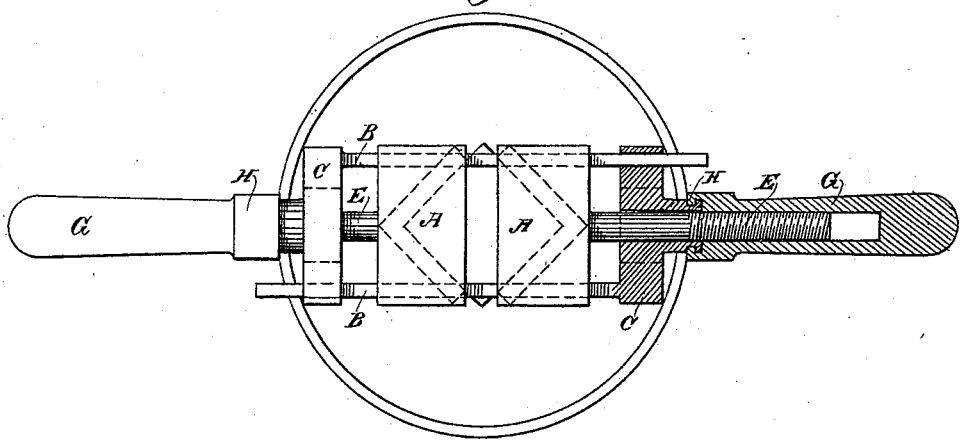
Figure 3:
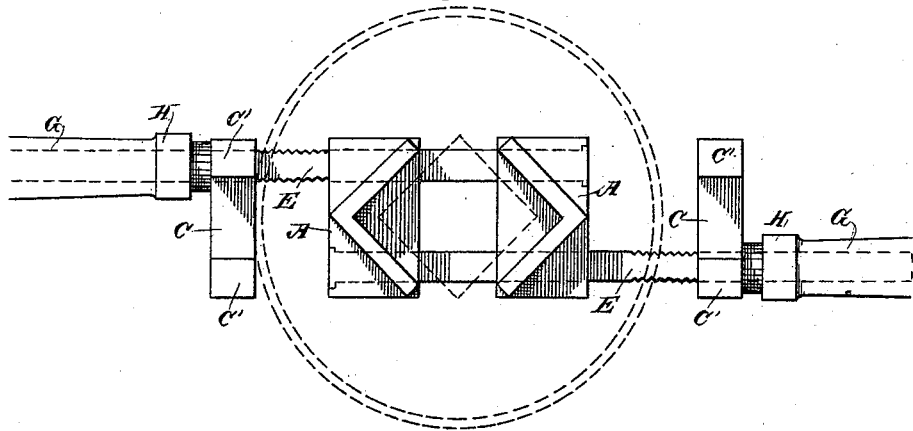

Figure 1 is an elevation, showing one application of my device. Fig. 2 is a face view, showing another form in which the clamps act upon the interior of the hub ring. Fig. 3 is a rear view of my device showing the clamps applied to the exterior of the hub ring.

A A are two sections movable to and from each other having their interior adjacent faces made to fit any form of nut which is ordinarily used upon a vehicle. In the present case these sections are shown as forming a square when brought together, as the majority of vehicle nuts are made rectangular, and it will be manifest that the angles of these sections will fit the opposite angles of such nuts, whatever may be their size.

B B are guides upon which the extensions from the clamping jaws A are adapted to slide, these extensions being sufficiently to one side of the jaws proper to allow the latter to enter the end of the wheel hub and clasp the angles of the nut.

C C are blocks adapted to slide upon the guides B, and carrying with them clamps C' which are adapted to fit the interior of the hub ring and form a frictional grip against it. Through these blocks pass the screw shanks E having handles by which they may be turned. In Fig. 1 these shanks E are fitted with enlarged heads F at the inner ends, which turn in sockets or chambers in the extensions of the clamps A, and the blocks C have screw-threads on the interior through which the screws E pass. By means of handles G upon the outer ends of these screws they are rotated in either direction. When turned in one direction the clamps A will be forced inwardly against the angles of the nut, and the blocks C will be correspondingly forced outward by reason of the travel upon the screw E. These blocks C carry the angular projections or clamps C' which engage the inner periphery of the hub ring and bind firmly against it when the screws have been turned sufficiently. This practically unites the gripping jaws A and the blocks C with the hub ring, so that if the wheel be now turned back the nut will be loosened from the spindle and turned off by the rotation of the wheel. The wheel is then removed from the spindle, and the nut remaining clamped in its central position in the hub ring, will not be dropped or lost while the spindle is being oiled or otherwise cared for, and when the wheel is to be replaced the nut is in exactly the proper position to fit upon the end of the spindle and by turning the wheel in the opposite direction from that required to remove the nut, the latter will be screwed upon the spindle end after which the jaws and clamping device are removed by loosening the screws. It will be manifest that the clamping jaws A will fit the angles of any square nut whatever may be its size and the clamps C' can be screwed far enough outwardly to fit the interior of any size of hub band, thus making the device universal in its use.

Fig. 2 shows an arrangement in which the outer end of the screw rod E is threaded and the handle G is screw-threaded on the interior to fit it. In this case the handle G has a flange ring H upon its inner end, the inwardly turned flanges of which fit into corresponding grooves in a cylindrical projection from the block C. This allows the handle to be turned and the block C and the jaws A advance in the same manner as previously described.

In Fig. 3 I have shown a device adapted so that the blocks C will clamp upon the exterior of the hub ring, while the jaws A clamp the nut as previously described. In this case the screw rods E pass through the blocks C and through the jaw A, which is nearest to them, being secured to the jaw A which is upon the opposite side of the nut.

The screw device shown in Fig. 2 may be employed to advance the clamps, and I have here shown the handle adapted to turn upon the screw-threaded end of the rod E and as it is turned it forces the clamp C' against the outside of the wheel hub band, while the half jaw A upon the opposite side of the nut is equally drawn against that side of the nut. The other half jaw and clamp work in the same manner, and thus connect the nut with the wheel hub, so that the turning of the latter will remove or replace the nut as before described.

It will be manifest that various devices for clamping the parts upon the hub band may be employed, but those which I have shown are very serviceable and practical.

Having thus described my invention, what I claim as new, and desire to secure by Letters Patent, is—

1. A device for turning nuts upon vehicle axles comprising opposing half jaws slidable to and from each other and adapted to fit upon the angles of the nut, rotatable operating handles having a screw connection with the jaws, and clamp blocks on the screw connections and movable thereby in directions opposite to the movements of the jaws and adapted to bind upon the hub band, substantially as herein described.

2. A device for turning nuts upon vehicles consisting of the combination of opposing jaws adapted to fit the nut and having side extensions, screws mounted to turn in said jaws having operating hand pieces, and the blocks having guides upon which the extensions of the jaws slide, said blocks being threaded on the screws and having clamps adapted to bind against the hub band, substantially as herein described.

In witness whereof I have hereunto set my hand.

DANIEL H. FAUST.

Witnesses:
S. H. NOURSE.
H. F. ASCHECK.